UNITED STATES PATENT OFFICE.

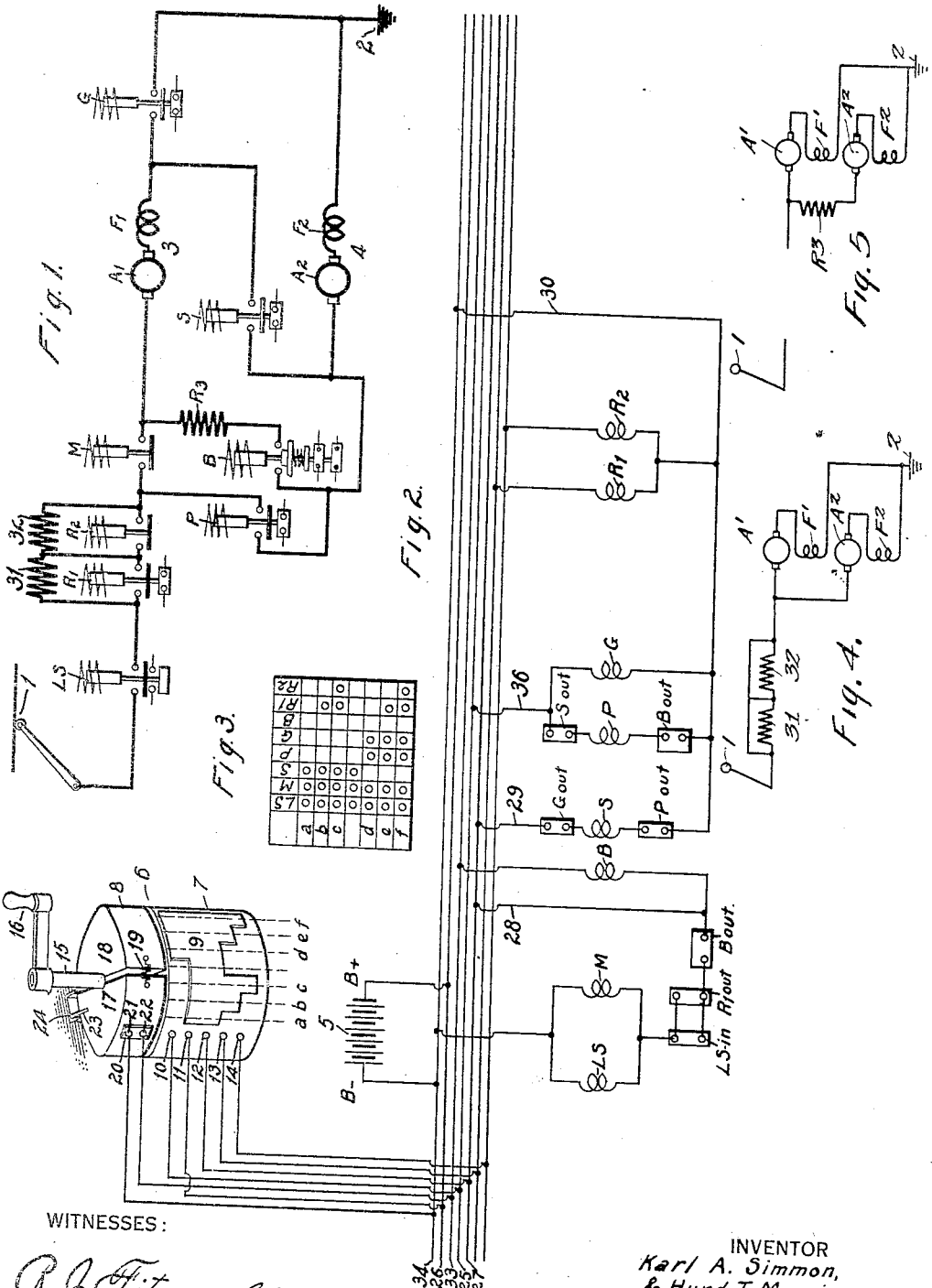

KARL A. SIMMON, OF EDGEWOOD PARK, AND HURD T. MORRIS, OF WILKINSBURG, PENNSYLVANIA, ASSIGNORS TO WESTINGHOUSE ELECTRIC AND MANUFACTURING COMPANY, A CORPORATION OF PENNSYLVANIA.

CONTROL SYSTEM.

1,292,656.  Specification of Letters Patent.  Patented Jan. 28, 1919.

Application filed November 5, 1915. Serial No. 59,832.

*To all whom it may concern:*

Be it known that we, KARL A. SIMMON, a citizen of the United States, and a resident of Edgewood Park, in the county of Allegheny and State of Pennsylvania, and HURD T. MORRIS, a citizen of the United States, and a resident of Wilkinsburg, in the county of Allegheny and State of Pennsylvania, have invented a new and useful Improvement in Control Systems, of which the following is a specification.

Our invention relates to control systems for electric motors and particularly to control systems for vehicle motors and the like.

One object of our invention is to provide a system, of the above-indicated character, that shall embody simple and effective means for establishing a loop circuit to include the driving motors, under predetermined operating conditions.

Another object of my invention is to provide a control system of the above-indicated character that shall establish a loop circuit including the motors of the system under predetermined circumstances for preventing an inductive discharge from the motor circuit from effecting an intense arcing at the motor control switches.

Another object of my invention is to provide a system having a controller that shall interrupt the main motor circuits whenever the controller is moved in a reversed direction a predetermined amount and establish a loop circuit through the motors of the system to prevent an inductive discharge from the same effecting an arcing at, and the consequent burning of the main-circuit interrupting-control members.

In many control systems which are provided with controllers that interrupt the motor circuits whenever the controllers are moved in a reverse direction a slight amount, an intense arcing at, and burning of, the motor-control switches is effected by the inductive discharge from the motors and especially in case the motors are connected to a high-voltage supply circuit.

However, in a control system constructed in accordance with my invention, the motor-control switches are only subjected to the arcing occasioned by the current flowing through the motors at the time the motor circuit is broken and are not subjected to the arcing occasioned by the inductive discharge from the motors.

In the accompanying drawing, Figure 1 and Fig. 2 are diagrammatic views of main circuits and auxiliary governing circuits, respectively, of a control system embodying our invention, Fig. 3 is a chart of well-known form showing the desired sequence of operation of the main circuit switches, with a forward movement of the controller, and Figs. 4 and 5 are diagrammatic views of the circuits completed through the motors when the controller is in the final operating position and when the controller is reversed a small distance.

Referring to Fig. 1 of the drawing, supply-circuit conductors 1 and 2 are adapted to deliver energy to motors 3 and 4 through a plurality of circuit-arranging switches LS, M, G, S and P, resistance-governing switches $R_1$ and $R_2$ and an auxiliary switch B. The various switches shown in Fig. 1 are controlled by suitable actuating coils that are correspondingly lettered in Fig. 2. The actuating coils referred to are energized from a suitable source of energy, such as a battery 5, and the various control circuits for these actuating coils are arranged by a master controller 6 and by a plurality of interlocking contact members, "LS—in", "$R_1$—out","G—out", "P—out" and "S—out" of a familiar type that are adapted to assume an "in" or an "out" position corresponding to the positions assumed by their respective governing switches.

The master controller 6 is of a slip-segment type, as hereinafter more fully described, and comprises a main rotatable drum 7 and an auxiliary disk 8.

The main drum 7 is adapted to assume a plurality of motor-accelerating positions *a* to *f*, inclusive, and comprises a conducting segment 9 that is adapted to engage a plurality of stationary terminal members 10, 11, 12, 13 and 14; an upwardly-projecting cylindrical portion 15; and a suitable operating handle 16.

The auxiliary disk 8 comprises a plurality of segmental members 17 and 18 that are held in frictional engagement with the portion 15 of the main drum 7 by suitable springs 19 that are disposed on opposite sides of the member 8; a conducting member 20 that is adapted to engage stationary terminal members 21 and 22; and a projecting member 23 that is adapted to engage the arms of a U-shaped stop 24, under predetermined conditions, and thereby limit the rotation of the disk 8 to an angle that preferably corresponds to a single notch on the controller.

It will be understood that, whereas, suitable motor-reversing switches and other apparatus are necessary for the successful operation of such a system as we propose, they are deemed unnecessary for a complete disclosure of our invention and have, therefore, been omitted from the drawing.

Assuming the apparatus and the various circuits to be as shown in the drawing, the motors are started and accelerated as follows: the main drum 7 of the master controller 6 is moved by the handle 16 into the position $a$. The auxiliary disk 8 and the terminal bridging member 20, carried thereby, are moved with the main conducting segment 9, by reason of the frictional engagement between the members 7 and 8, until the projecting member 23 engages the stop 24. In this position, the terminal bridging member 20 becomes disengaged from the terminals 21 and 22, whereas, the conducting segment 9 engages the terminal members 11 and 12 and thereby establishes a circuit from the positive terminal B+ of the storage battery 5 through train-line conductor 26, terminal member 11, conducting segment 9 and terminal member 12 to the train-line conductor 27, where the circuit divides and one path continues through conductor 28, interlocks "B—out" and "$R_1$—out" and switch coils LS and M, grouped in parallel-circuit relation, to the negative terminal B— of the battery. The other path continues through conductor 29, interlock "G—out", switch coil S, interlock "P—out" and conductor 30 to the negative terminal B— of the battery 5.

The completion of the above-recited circuits energizes the switch-actuating coils LS, M and S of Fig. 2 and thereby establishes a main circuit in Fig. 1 from the supply-circuit conductor 1 through the line switch LS, resistors 31 and 32, switch M, driving motor armature $A_1$, field-magnet coil $F_1$, switch S, motor armature $A_2$ and field-magnet coil $F_2$ to the supply-circuit conductor 2. The motors 3 and 4 and resistors 31 and 32 are thus disposed in series relation across the supply circuit 1—2 and thereby effect a predetermined acceleration of the motors.

In order to further accelerate the motors, the controller drum 7, shown in Fig. 1, is moved forwardly into the several remaining positions $b$, $c$, $d$, $e$ and $f$. The switches that are closed in these respective positions may readily be noted from the chart in Fig. 3, and, since these intermediate steps are irrelevant to the invention, a detailed description thereof is not deemed necessary, and the controller may be assumed to have been brought into the position $f$. In this position, the switches LS, M, P, G, $R_1$ and $R_2$ of Fig. 1 are closed, and the driving motors are thereby disposed in full-parallel-circuit relation across the supply source, as is illustrated in Fig. 4 of the drawing.

If the main controller drum 7 is moved backwardly a single notch from the forward position $f$, the auxiliary disk 8 and the terminal bridging member 21 carried thereby, will be moved with the main conducting segment 9 until the projecting member 23 engages the stop 24. In this position and for the succeeding backward positions $e$ and $d$, the terminal bridging member 20 engages the terminal members 21 and 22 and thereby establishes a conducting path from the positive terminal B+ of the battery 5 through the train-line conductor 26, terminal 11 and conducting segment 9, where the circuit divides and one branch continues through terminal 12, train-line conductor 27, conductor 28, energizing coil of switch B, train-line conductor 33, terminal member 22, conducting member 20, terminal member 21 and train-line conductor 34 to the negative terminal B— of the battery 5. The other branch continues through terminal member 10, train-line conductor 25, conductor 36, switch-energizing coil G, conductor 30 and train-line conductor 34 to the negative terminal B— of the battery. The establishment of the above-recited circuits energizes the actuating coil for switch B and maintains the coil for switch G energized and thereby causes switch B to close and switch G to remain closed.

It should be noted that, by reason of the closed condition of the switch B, a closed loop circuit is formed through the motors 3 and 4 that includes the resistor $R_3$ and the switch G, and the interlocking-bridging terminal members B—out are excluded from circuit whereby the circuits for energizing the coils of switches LS, M and P are interrupted and the corresponding switches are dropped out. The closed-loop circuit formed through the motors 3 and 4 prevents the inductive discharge of the same from effecting an intense arcing at the switches LS, M and P when the same are released.

The relatively wide terminal-bridging members "B—out" prevent the interruption of the main control circuit until the auxiliary circuit has been established. The contact member of the switch B, which is resiliently mounted as shown in Fig. 1, provides a path when operated, including the resistor $R_3$, in parallel relation with the closed switches P and M for an instant before the latter are opened. In this way, the switches P and M open a shunt connection across the resistor $R_3$, and a comparatively small amount of energy is dissipated by these switches, as will be readily understood.

If, at any time, the switch B fails to operate because of, for example, a defect in the control circuit thereof, the main control circuit will continue to function properly for all forward operating positions of the controller.

If the control handle is moved backwardly until the drum 7 occupies either of the positions $c$, $b$ or $a$, the terminal member 10 will become disengaged from the main conducting segment 9 and thereby interrupt the control circuit for the switch G, and, by reason of this interruption, will open the loop circuit at switch G.

It should be understood that, whereas, for clearness and convenience in illustration and description, we have shown our invention as incorporated in a simple and familiar control system, the invention is not so restricted in operation and we desire, therefore, that only such limitations shall be imposed as are set forth in the appended claims.

We claim as our invention:

1. A control system comprising a plurality of electric motors, a plurality of electrically-controlled switches for controlling said motors, a controller for governing the operation of said switches, and circuit-closing means associated with said controller for opening certain of said switches to open the motor circuit and for establishing a loop circuit to include said motors for preventing an injurious inductive discharge from the motors when the controller is moved backwardly a predetermined slight degree.

2. In a control system, the combination with a plurality of electric motors, a plurality of switches for controlling said motors, and a controller for governing the operation of said switches, of means for establishing a loop circuit through said motors to prevent an inductive discharge from the same in case the controller is moved backwardly a single notch and the motor circuit is broken.

3. In a control system, the combination with a plurality of electric motors, a plurality of switches for controlling said motors, and a controller for governing the operation of said switches from an advanced parallel position, of means for establishing a loop circuit when the controller is moved backwardly a single notch, and means for interrupting said loop circuit upon the continued backward movement of the controller.

4. In a control system, the combination with a plurality of electric motors, a plurality of switching devices for controlling said motors, and a controller for governing the operation of said switching devices, of an auxiliary switch and circuit-closing means associated with said controller for operating said switch to establish a loop circuit through said motors when the controller is moved backwardly a single notch.

5. A control system embodying a plurality of electric motors, a plurality of switches for controlling said motors, a controller for governing the operation of said switches, an auxiliary switch and means associated with said controller for operating said auxiliary switch to establish a loop circuit through the motors and to open the main motor circuit when the controller is moved a slight degree toward the off position from a parallel position.

6. In a system of control, the combination with a plurality of dynamo-electric machines, a plurality of electrically operated switching devices for governing the operation thereof, and controlling means for said switching devices, of circuit-closing means associated with said controlling means for effecting the opening of certain of said switching devices to open the motor circuit and for closing certain other of said switching devices to establish a loop circuit through the motors when said controlling means is moved a predetermined slight degree toward the initial position.

7. In a system of control, the combination with a plurality of motors and a controller for governing the operation thereof, of an auxiliary switch, and means associated with said controller for operating the switch to form a single closed circuit through the motors and to open the main motor circuit when the controller is reversed a small amount from an operative position.

8. In a system of control, the combination with a plurality of motors, a plurality of switches for connecting the motors in series and in parallel-circuit relation, and a controller for governing the operation of said switches, of an auxiliary switch, and means associated with said controller for operating the auxiliary switch and for releasing certain of said switches to open the motor circuit and to establish a loop circuit through the motors under predetermined conditions.

9. In a system of control, the combination with a plurality of motors, and means comprising a controller for governing the operation of said motors, of an auxiliary switch and means associated with said controller for operating said auxiliary switch to form a loop circuit through the motors for preventing an inductive discharge therefrom when the motor circuit is broken under predetermined conditions.

10. In a system of control, the combination with a plurality of motors, a plurality of switches for governing the operation of the motors in series and in parallel-circuit relation, and a controller for governing the operation of said switches, of an auxiliary switch and means associated with said controller for operating the auxiliary switch under predetermined conditions, said auxiliary switch completing a loop circuit through the motors and releasing certain of said switches to open the motor circuit and prevent an inductive discharge from the motors.

In testimony whereof, we have hereunto subscribed our names this 28th day of Oct., 1915.

KARL A. SIMMON.
HURD T. MORRIS.

Copies of this patent may be obtained for five cents each, by addressing the "Commissioner of Patents, Washington, D. C."